Sept. 29, 1931.  A. F. McNISH  1,825,082
ROTARY MACHINE FOR MANUFACTURING GLASS HOLLOW
WARE AND OTHER MOLDED ARTICLES OF GLASS
Filed April 12, 1929  6 Sheets-Sheet 3

Sept. 29, 1931.  A. F. McNISH  1,825,082
ROTARY MACHINE FOR MANUFACTURING GLASS HOLLOW
WARE AND OTHER MOLDED ARTICLES OF GLASS
Filed April 12, 1929   6 Sheets-Sheet 4
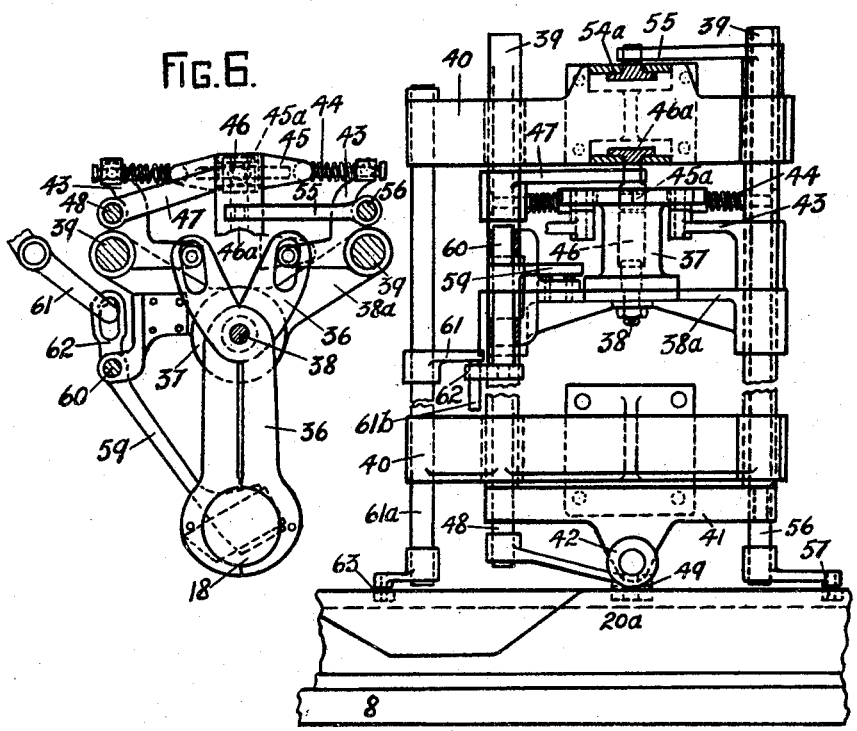
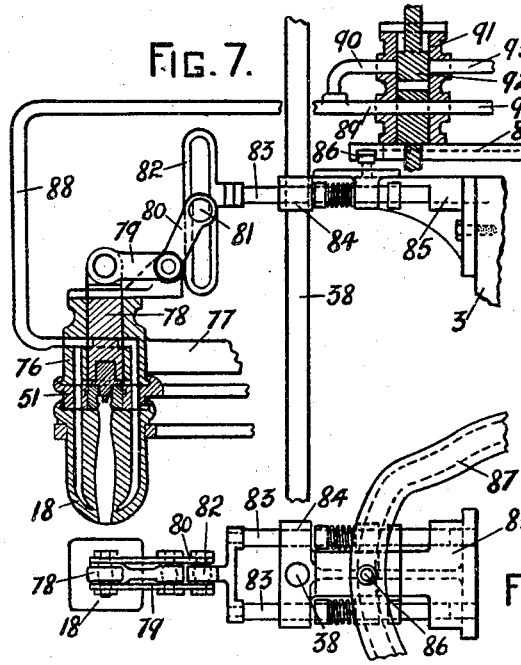
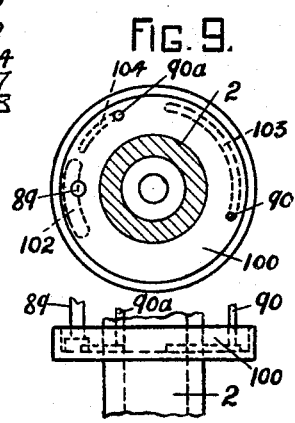
Inventor
Alexander Francis McNish
By Knight Bro
Attorneys Sept. 29, 1931.  A. F. McNISH  1,825,082
ROTARY MACHINE FOR MANUFACTURING GLASS HOLLOW
WARE AND OTHER MOLDED ARTICLES OF GLASS
Filed April 12, 1929    6 Sheets-Sheet 5
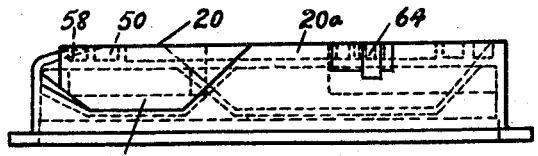
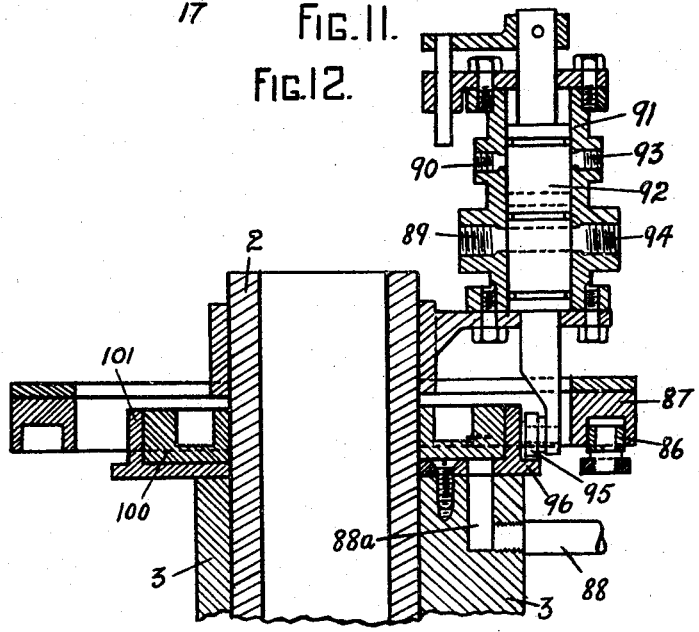
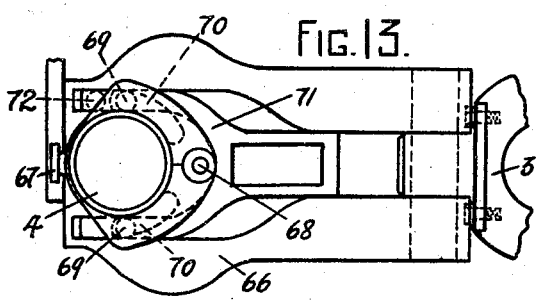
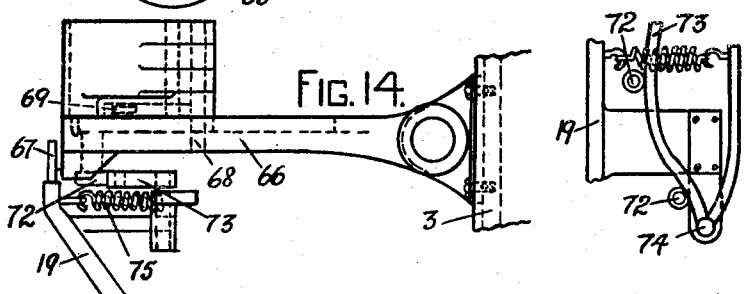

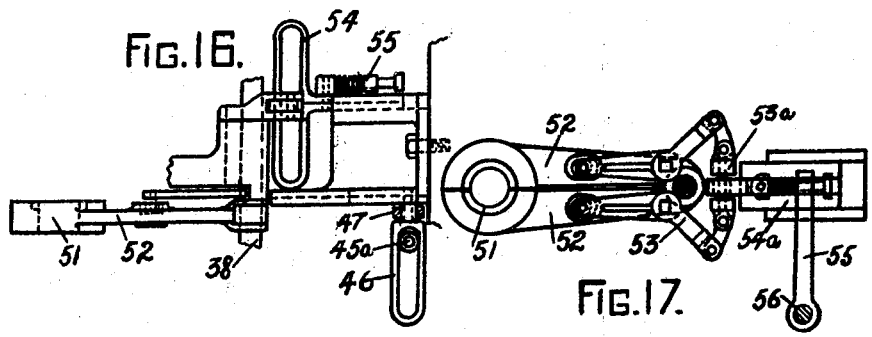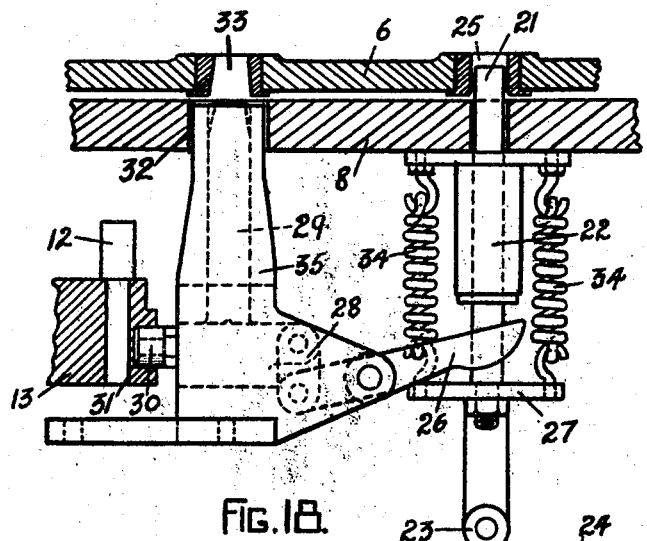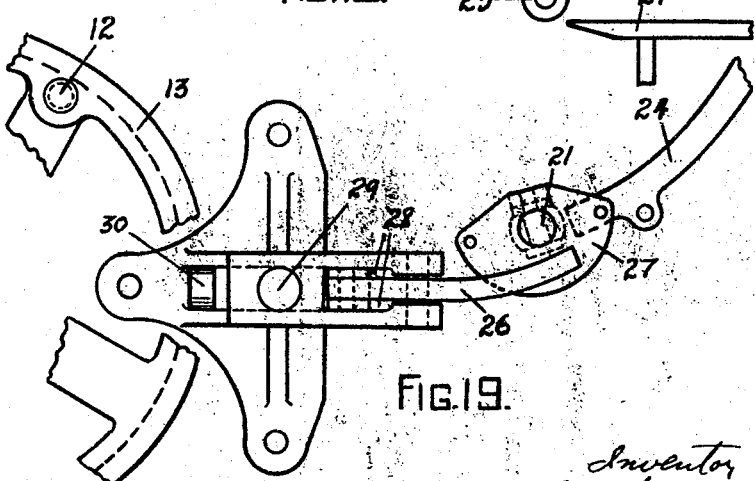

Patented Sept. 29, 1931

1,825,082

UNITED STATES PATENT OFFICE

ALEXANDER FRANCIS McNISH, OF PERTH, SCOTLAND, ASSIGNOR OF ONE-HALF TO JOHN MONCRIEFF LIMITED, OF PERTH, SCOTLAND

ROTARY MACHINE FOR MANUFACTURING GLASS HOLLOW-WARE AND OTHER MOLDED ARTICLES OF GLASS

Application filed April 12, 1929, Serial No. 354,574, and in Great Britain June 1, 1928.

This invention relates to rotary machines for the manufacture of glass bottles or other hollow-ware or molded articles of glass, wherein the machine is of the suction-gathering type and comprises suction and blow heads, parison molds and finishing molds revolving in a horizontal or substantially horizontal plane.

The invention consists broadly of a table or support and mold-supporting column rotatable together through part of a circle to bring a blowhead and a rising and falling parison mold into position for gathering a charge of glass, the column which carries the molds being then stopped while the table returns to its normal position, mechanism actuated by the reverse movement of the table causing the parison mold to dip into the charging trough and to be withdrawn therefrom with the gather, whilst transferring a parison from one of the parison molds to a finishing mold. The reverse movement of the table may also be caused to operate shears for trimming the parison and for opening the finishing molds to enable the molded article to be removed.

The invention furthermore consists in mounting the finishing molds to rise and fall during the return movement of the table, preferably by hinging the finishing molds upon the central rotatable column, and in providing the table with an inclined track which cooperates with the finishing molds to raise the same into transfer position to receive the parison, and to allow the finishing molds to fall in readiness for delivering the molded article.

The table oscillates through an angle equal to the angle between the molds, as for example 120 degrees in the case of a three-mold machine, and mechanism is provided whereby the table drives the mold-supporting column during the forward movement of the table, whilst movement of the mold-supporting column is arrested during the reverse movement of the table.

Suitable cams are mounted upon the oscillating table for raising and lowering the parison molds, for opening and closing the same, for operating the trimming shears, and for opening and closing the neck ring of the blow head or parison mold.

The accompanying drawings illustrate one example of a glass bottle making machine constructed according to my invention, but it will be understood from the appended description that the illustrations are in some respects diagrammatic, parts of the machine having been omitted where it has been thought desirable in order to more clearly demonstrate the salient features of the machine.

Fig. 5 is an elevation, partly in section, looking towards one of the parison molds.

Fig. 6 is a detail plan view of the parison mold and its opening and closing links.

Fig. 7 is a part sectional elevation of the parison mold and valves.

Fig. 8 is a plan view of the parts shown in Fig. 7.

Figs. 9 and 10 are detail views of the air and vacuum distributing valve.

Fig. 11 is a side view of the table cams.

Fig. 12 is a sectional view showing the air and vacuum control valve, the valve being turned through 90° for convenience of illustration.

Figs. 13 and 14 are plan and side views of the finishing mold.

Fig. 15 is a plan view of the track cam for opening and closing the finishing mold.

Figs. 16 and 17 are side and plan views of the neck ring mechanism.

Figs. 18 and 19 are a fragmentary sectional elevation and plan respectively of the locking and driving pins and associated parts.

Figure 1:
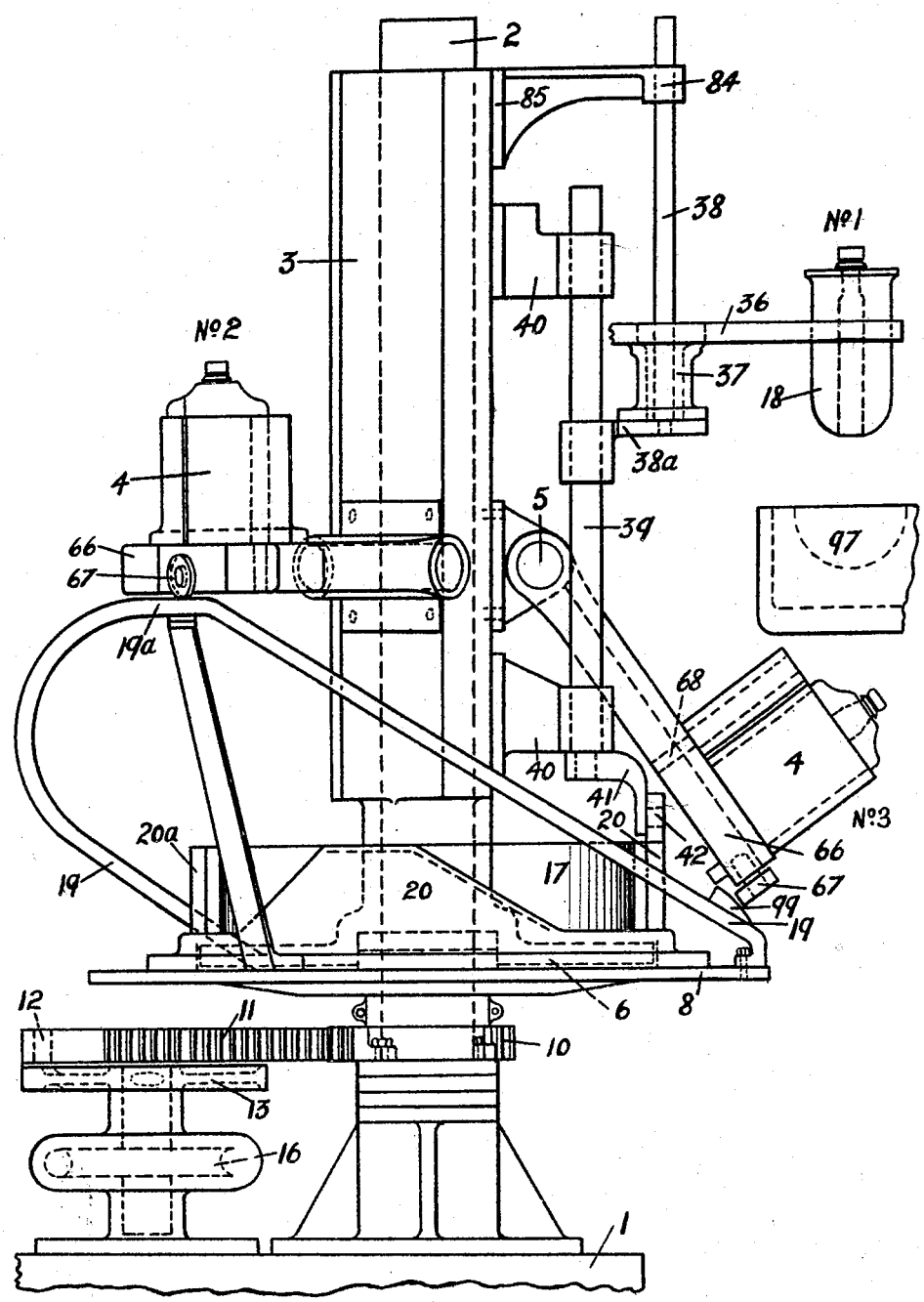
Fig. 1 is a side view of the general assembly of the machine.

Referring to the drawings (Figs. 1 and 2), the machine comprises a base 1 mounted upon screw-threaded legs adjusted vertically by nuts operated by chain and sprocket gearing 1a. The base 1 supports a fixed central vertical spindle 2. The spindle 2 extends almost the full height of the machine and upon it revolves a hollow triangular prism or flat-sided column 3 to which the finishing molds 4 are hinged upon horizontal fulcrums 5. The lower end of the column 3 has a flange 6 which is supported by means of a ball bearing 7 just above a table 8 adapted to revolve upon a ball bearing 9. The table 8 revolves with a toothed quadrant 10 which meshes with a rack 11 (see also Fig. 3) having a fulcrum at one end upon a crank pin 12 carried by a wheel 13. The free end of the rack 11 is held in mesh with the quadrant 10 by vertical pins or rollers 14 on lugs 15 projecting from a loose ring 15a. The rack is guided between the pins 14. The wheel 13 is mounted to turn with worm gearing 16 driven from any suitable source of power and it will be understood that rotation of the wheel 13 will reciprocate the rack 11 which in turn will oscillate the quadrant 10 and table 8 through an angle of 120 degrees or one-third of a complete revolution. Any other suitable gearing may be provided for oscillating the table.

Figure 4:
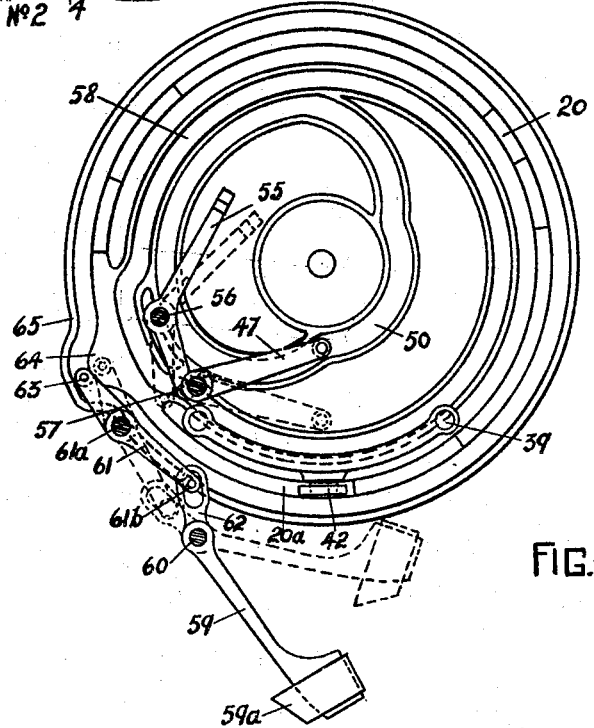
Fig. 4 is a plan view of the cam grooves in the table showing parts of the operating mechanism.

On the table 8 are mounted the cam plate 17 (Fig. 11) for opening and closing the parison molds 18 and neck ring 51, the track 19 for raising and lowering the finishing molds 4, the cams 20 and 20a for raising and lowering the parison molds 18 for gathering and blowing, and also the cam 64 (Fig. 4) for operating the shears.

A driving pin 21 (Figs. 18 and 19) slides vertically in a housing 22 on the underside of the table 8 and carries at its lower end a roller 23 which is adapted to ride over and under a fixed arcuate track 24 when the table oscillates. During the forward movement of the table 8, the roller 23 rides on the track 24 and the upper end of the driving pin 21 is projected by springs 34 into a hole 25 in the column flange 6, thereby locking the mold-supporting column to the table during the forward movement of the latter. At the end of its forward stroke, the driving pin 21 is withdrawn from the hole 25 in the flange 6 by a lever 26 which depresses a crosshead 27 on the driving pin 21. The lever 26 is connected by links 28 to a vertically-movable locking pin 29 which moves in a fixed bracket or housing 35 in such manner that, when the lock-pin 29 is raised, the drive-pin 21 is lowered. The lock-pin 29 is raised and lowered by the provision on the lock-pin 29 of a roller 30 operating in a cam groove 31 in the wheel 13. The locking-pin 29 when raised passes through an arcuate slot 32 in the table 8 into one of three locking holes 33 provided in the flange 6 of the mold-supporting column at 120 degrees apart. The end of the fixed track 24 is inclined so as to assist in drawing down the drive-pin 21 at the end of its forward stroke. The roller 23 rides under the track 24 on the return stroke of the table 8 and thereby holds the drive pin 21 out of operation. Thus the drive pin 21 rotates the mold-supporting column during each forward stroke and the locking pin 29 holds the mold-supporting column stationary during each return stroke of the table.

The parison molds 18 (Figs. 1, 5 and 6) are each split as usual, the two halves being each carried by an arm 36 pivoted upon a bracket 37 which is fixed upon a spindle 38 and is fixed to a crosshead 38a fixed to vertical guide rods 39 which slide in brackets 40 fixed to the mold-supporting column 3. The lower ends of the guide rods 39 carry a crosshead 41 on which is mounted a roller 42 which cooperates with the cams 20 and 20a on the oscillating table 8 to raise and lower the parison molds. The parison mold is opened and closed by connecting the parison arms 36 by pin and slot connections to bell-cranks 43 turning on the rods 39 and connected by rods 44 to a crosshead 45 (similar to the crosshead 53a of Figs. 16 and 17) having a roller 45a (Fig. 16) movable in a slotted link 46 carried by a slide 46a moved towards and away from the parison by an arm 47 projecting from a vertical shaft 48 which carries at its lower end a roller 49 running in a cam groove 50 (Fig. 4) in the cam plate 17. The cam groove 50 is shaped to close and open the parison molds at the required times and the cams 20 and 20a raise and lower the parison as required. The slotted link 46 allows the parison mold to be opened and closed either in its raised or lowered position.

The holder of the neck ring 51 (Figs. 16 and 17) of the parison mold similarly consists of a pair of pivoted arms 52 opened and closed by actuating links 53 connected by a crosshead 53a having a central roller which works in a slotted link 54 having a slide 54a moved towards and away from the mold by a lever 55 projecting from a vertical shaft 56 which carries on an arm at its lower end a roller 57 which runs in a cam groove 58 (Figs. 2 and 4) in the cam plate 17.

A shear arm 59 (Fig. 4) for each parison mold is pivoted on a vertical shaft 60 carried in bearings fixed on the crosshead 38a (see Fig. 5) and is operated by a lever 61 on a shaft 61a, the lever 61 having a long pin 61b engaging an arm 62 at the lower end of the shaft 60, a lever on the lower end of shaft 61a having a pin or roller 63 which cooperates with a cam 64 on the cam plate 17. An annular guide 65 fixed on the oscillating table 8 guides the movement of the rollers 63 as the table oscillates to and fro in relation to the column.

Figure 2:
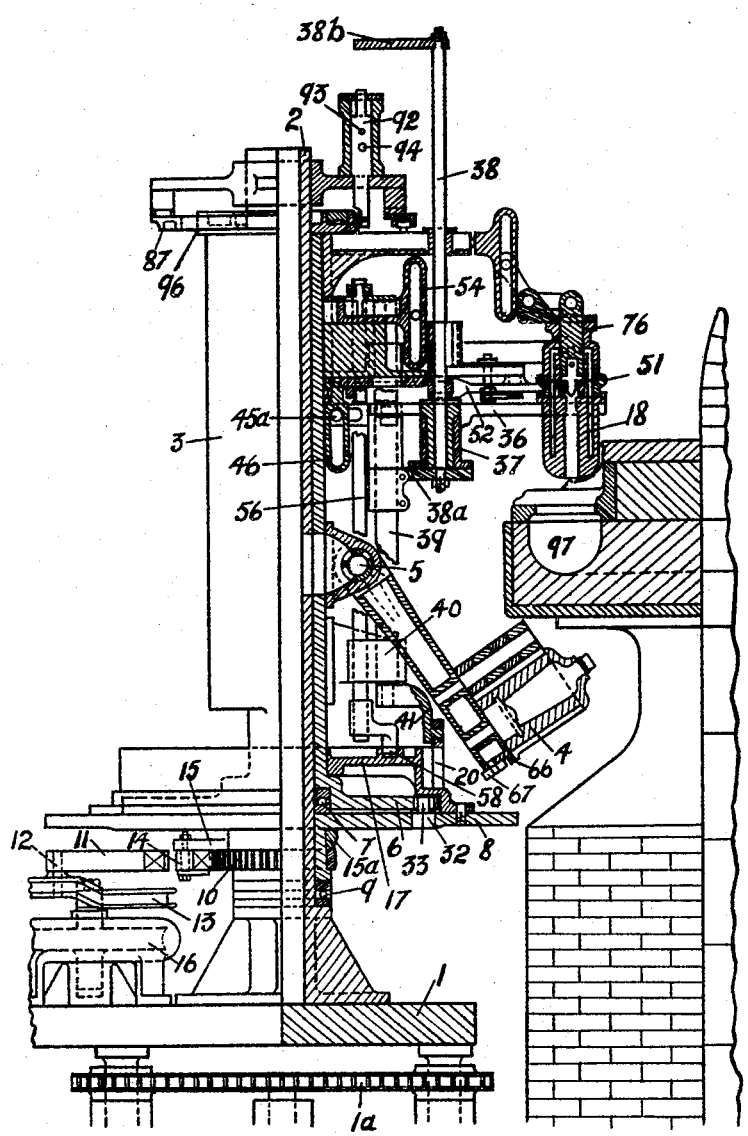
Fig. 2 is a half-sectional elevation of the machine, and a half outside view of the machine with parts removed.
Figure 3:
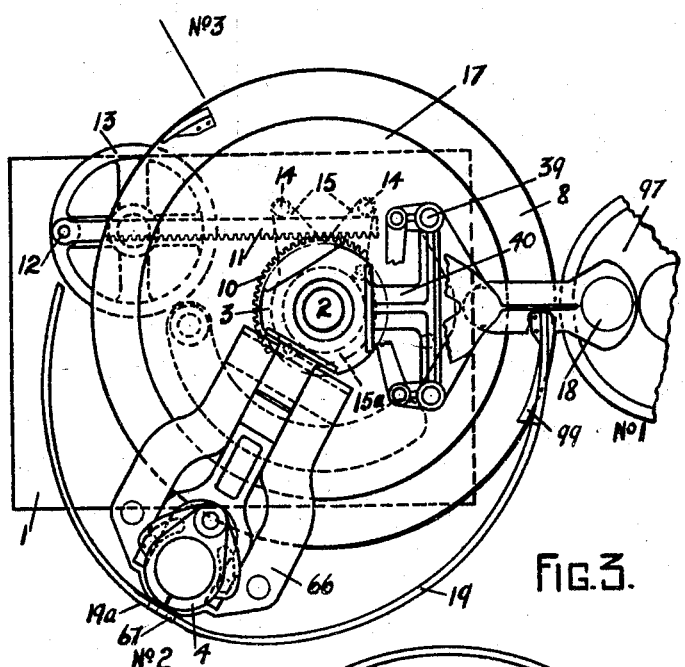
Fig. 3 is a general plan view of parts of the machine.

The track 19 for raising and lowering the finishing molds 4 extends substantially two-thirds of the way around the table and consists (as shown in Figs. 1 and 3) of a rail or bar bent to the form shown so that it rises upwards and outwards from each end to a level portion 19a which is at such a distance from the central column and at such a height as to support the finishing mold 4 in an upright position as shown. The finishing molds 4 are each mounted upon a base plate or member 66 which is pivoted on the fulcrum 5 and has end rollers 67 which run upon the track 19.

The base plate normally hangs downwards at an angle, with the finishing mold projecting outwards and upwards therefrom, so that the neck of the bottle can be conveniently grasped when the finishing mold is in the delivery position.

The opening and closing of the finishing mold 4 is effected by pivoting the two halves of the finishing mold on a pin 68 (Figs. 13 and 14) on the base member 66 and providing two pins, rollers or projections 69 on a slide 71 for engaging an arcuate slot 70 in each half of the mold to close and open the mold when the slide 71 is reciprocated. The slide 71 is operated by providing it with a roller 72 which rides along a cam bar 73 (Fig. 15) fixed at the highest point of the track 19 for closing the mold. The cam bar 73 is pivoted at 74 and held in the path of the roller 72 by a spring 75. A fixed cam 99 (Figs. 1 and 3) opens the finishing mold at the delivery position.

The charge of glass is drawn into the parison mold by creating a vacuum in the blow head 76 of the parison mold. This is carried in a bracket 77 (Figs. 7 and 8) and has a plunger 78 connected to links 79 and 80, the latter having a roller 81 movable in a slotted link 82 carried by slide rods 83, which slide in cross heads 84 and 85. Through the cross-head 84 slides the spindles 38. The crosshead 85 is fixed to the column 3. A roller 86 carried by the slide rods 83 engages a cam groove in a fixed cam 87 at the head of the machine. A pipe 88 leads to the blow head which has ports controlled by the plunger 78. The pipe 88 has connections 89 and 90 to a valve chest 91 containing a piston valve 92 which controls an air inlet pipe 93 and a vacuum pipe 94. The valve 92 is lifted by a roller 95 (Fig. 12) on its lower end cooperating with a cam track 96 fixed on the column 3 and is depressed by a finger 38b on shaft 38.

Figs. 9 and 10 show a timing valve 100 for regulating the supply of compressed air to the blow head and for controlling the vacuum connection. This timing valve 100 is mounted on the top of the triangular column 3 (Fig. 12) within a cylindrical valve casing 101. The valve 100 thus remains stationary whilst the valve case 101 rotates with the triangular column. The valve 100 is interposed between the blow-heads 76 and the valve 92 (Fig. 12) and the pipes 88 from the three blow-heads open into the valve case 101. The valve 100 has on its underside three slots or recesses 102, 103 and 104 which connect respectively to a vacuum pipe 89 and to compressed air pipes 90 and 90a. When the port 88a (Fig. 12) traverses the slot 102, the blow-head is connected to the vacuum pipe for gathering the charge. When the port 88a traverses slot 104, the parison is blown, and when the port 88a traverses slot 103, the blow-head is supplied with air for blowing the bottle.

In order that the operation of the machine may be more readily understood, the sequence of operations carried out by one of the parison molds will now be described.

As shown in Figs. 1 and 3, the position at which the parison mold dips for gathering the charge of glass is designated position No. 1, the position at which the parison is transferred to the finishing mold is designated No. 2 position and the position No. 3 is the position in which the parts have completed their sequence of operations.

The parison mold 18 as it approaches the gathering position is closed and the plunger 78 is depressed (as shown in Fig. 7) by the cooperation of cam 87 with roller 86 in readiness to form the usual depression in the neck of the parison. The parison mold is brought into the gathering position by the forward rotation of the table 8. As soon as the latter completes its forward movement, the column 3 is locked in a stationary position and the parison mold is then in position No. 1 with the roller 42 resting on the top of the cam 20a. As soon as the table 8 reverses, the cam 20a is moved from under the roller 42, causing the parison mold to dip into the glass in the furnace forehearth 97. At this moment the blow-head connections are in the position shown in Fig. 7, i. e. the blow-head is connected to the vacuum or suction pipe 94 and a charge of glass is thus drawn into the parison mold.

Just before the table 8 reaches the end of its reverse movement, cam 20 raises the parison mold. At the same time, the shear blade 59a is operated by its cam to trim the parison.

The table 8 then commences its forward movement and carries with it the column 3 and parison molds. During this movement the finishing mold 4 hangs down in the position shown in Figs. 1 and 2. During this movement also, cam 96 lifts valve 92, closing vacuum connection 89, 94 and opens air connection 90, 93. The timing valve 100, however, cuts off communication between air pipe 90 and blow head until groove 104 connects with port 88a. In the meantime, plunger 78 has been withdrawn by cam 87 operating roller 86. The charge of glass is thus blown. The shears are lowered until just clear of the parison by mechanism not shown. As soon as the parison mold reaches No. 2 position, the table 8 is at the end of its forward stroke. On the reverse movement of the table, the returning track 19 lifts the finishing mold 4 to its highest position. At the same time the parison is released from the parison mold by the cooperation of the cam groove 50 with the roller 49, and the parison is dropped into the finishing mold by the cam 20 riding from under the roller 42. The finishing mold is then closed upon the parison by the cam bar 73 on the high part of the track 19. The table 8 then commences its forward travel again and the bottle is blown as the parison travels from the position No. 2 to position No. 3. On the next reverse movement of the table 8, the neck ring 51 is opened by the cooperation of the cam groove 58 with the roller 57. This allows the cam 20a to raise the blow head, neck ring and open parison mold to their highest positions. At the same time the finishing mold rides down the returning track 19 until it again hangs downwards. The neck ring and parison mold close during the returning movement of the track so that, on the next forward movement of the table, the parison mold is in readiness for gathering and the plunger is depressed, the parison mold moving into the gathering position. The finishing mold with the blown bottle is carried round by the intermittent rotation of the table 8 until, when it again reaches the position No. 2, and still hangs downwards, it is struck by a fixed cam 99 on the rear end of the track 19 to open the finishing mold in readiness for enabling the finished article to be removed as the opened finishing mold is being lifted by the reverse movement of the track.

Claims:

1. In a glass working machine, the combination of a central support, a mold carrier revoluble about said support, a member oscillatory about said support, means for oscillating said member through part of a circle, means for connecting said carrier and member in one direction of oscillation of said member to move the mold carrier forward, means for arresting the mold carrier during the return movement of said member, a series of separable molds carried by said carrier, mechanism on said carrier for operating said molds, and devices movable with said member and cooperating with said mechanism to effect the operation of said molds during the return movement of said member.

2. In a glass working machine, the combination of a central support, a mold carrier revoluble about said support, a member oscillatory about said support, means for oscillating said member through part of a circle, means for connecting said carrier and member in one direction of oscillation of said member to move the mold carrier forward, means for arresting the mold carrier during the return movement of said member, a series of separable parison molds vertically movable on said carrier, mechanism on said carrier for raising and lowering said molds, and devices movable with said member and cooperating with said mechanism to raise and lower the molds during the return movement of said member.

3. In a glass working machine, the combination of a central support, a mold carrier revoluble about said support, a member oscillatory about said support, means for oscillating said member through part of a circle, means for connecting said carrier and member in one direction of oscillation of said member to move the mold carrier forward, means for arresting the mold carrier during the return movement of said member, a series of separable parison molds vertically movable on said carrier, mechanism on said carrier for raising and lowering and for opening and closing said molds, and devices movable with said member and cooperating with said mechanism to raise and lower the molds and for opening and closing the molds during the return movement of said member.

4. In a glass working machine, the combination of a central support, a mold carrier revoluble about said support, a member oscillatory about said support, means for oscillating said member through part of a circle, and means for connecting said carrier and member in one direction of oscillation of said member to move the mold carrier forward, means for arresting the mold carrier during the return movement of said member, a blow head and separate mold carried by said carrier in cooperative relationship and vertically movable on said carrier, mechanism on said carrier for raising and lowering said blow head and mold, and devices movable with said member and cooperating with said mechanism for rasing and lowering the blow head and mold during the return movement of said member.

5. In a glass working machine, the combination of a central support, a mold carrier revoluble about said support, a member oscillatory about said support, means for oscillating said member through part of a circle, means for connecting said carrier and member in one direction of oscillation of said member to move the mold carrier forward, means for arresting the mold carrier during the return movement of said member, a separable parison mold, a blow head, a separable neck ring and a finishing mold all carried by said carrier, mechanism on said carrier for opening and closing the parison and finishing molds and neck ring, mechanism on said carrier for transferring the parison to the finishing mold, and devices movable with the oscillatory member and cooperating with said mechanisms for effecting the opening and closing of the molds and neck ring and for transferring the parison during the return movement of said member.

6. In a glass working machine, the combination of a central support, a mold carrier revoluble about said support, a member oscillatory about said support, means for oscillating said member through part of a circle, means for connecting said carrier and member in one direction of oscillation of said member to move the mold carrier forward, means for arresting the mold carrier during the return movement of said member, a series of separable parison molds equally spaced around and supported from said carrier, a separable neck ring and a blow head associated with each parison mold, a separable finishing mold beneath each parison mold, means for operating said molds, and cam devices carried by said oscillatory member for actuating the mold operating means during the return movement of said member.

7. In a glass working machine, the combination of a central support, a mold carrier revoluble about said support, a member oscillatory about said support, means for oscillating said member through part of a circle, means for connecting said carrier and member in one direction of oscillation of said member to move the mold carrier forward, means for arresting the mold carrier during the return movement of said member, a series of separable parison molds vertically movable on said carrier, mechanism on said carrier for raising and lowering said molds, devices movable with said member and cooperating with said mechanism to raise and lower the molds during the return movement of said member, mechanism for trimming the parison after the mold is raised, and means operated at the end of the return movement of said member for actuating the trimming mechanism.

8. In a glass working machine, the combination of a central vertical support, a column rotatable upon said support, separable parison molds equally spaced around and supported from said column, a separable finishing mold beneath each parison mold and mounted upon said column to rise and fall, an oscillatory member movable upon said central support, means for rotating said column and oscillatory member together through part of a circle, means for returning the oscillatory member while the column remains stationary, and mechanism actuated by the return movement of said oscillatory member for raising one finishing mold and for simultaneously lowering the preceding finishing mold.

9. In a glass working machine, the combination of a central vertical support, a column rotatable upon said support, separable parison molds equally spaced around said column, means for supporting said molds from said column to permit said molds to rise and fall, a suction and blow head above each mold, an oscillatory cam mounted on said support, means for rotating said column and cam through part of a circle in one direction to advance the mold, means for returning the cam while the column is stationary, and mechanism actuated by the cam on its return movement for raising and lowering the molds.

10. In a glass working machine, the combination of a central vertical support, a column rotatable upon said support, separable parison molds equally spaced around said column, means for supporting said molds from said column to permit said molds to rise and fall, a separable neck ring and a suction and blow head above each mold and carried by said column, a finishing mold mounted below each parison mold and carried by said column to rise and fall, an oscillatory cam table mounted on said support, means for rotating said column and table through part of a circle in one direction to advance the molds, means for returning the table while the column is stationary, and mechanism actuated by cams on said table for operating the molds and neck ring during the return movement of said table.

11. In a glass working machine, the combination of a rotatable mold carrier, a series of parison molds mounted on said carrier and equally spaced apart, a finishing mold hinged to the carrier beneath each parison mold, means for rotating said carrier stepwise, a track inclined downwards towards each end and cooperating with said finishing molds, means for rotating said track about the mold carrier axis when the molds advance and means for returning the track to its normal position while the mold carrier remains stationary to cause said track to simultaneously raise one finishing mold while allowing the preceding mold to fall during the period of rest of the mold carrier.

12. In a glass working machine as specified in claim 11, mechanism on the track for cooperating with the finishing molds to open and close the latter.

13. In a glass working machine, the combination of a rotatable mold carrier, a series of parison molds mounted on said carrier, and equally spaced apart, a finishing mold hinged to the carrier beneath each parison mold, means for rotating said carrier stepwise, a member oscillatory about the carrier axis, means for rotating said member in one direction with the carrier, means for returning said member while the carrier is at rest, and a track inclined downwards and inwards on both sides of an elevated substantially horizontal portion for supporting a finishing mold in the transfer position, the extremities of said rail being fixed to said member.

14. In a glass blowing machine, a fixed central vertical spindle, a column rotatable upon said spindle, a series of finishing molds hinged to said column, a horizontal disc-like member revoluble upon said spindle, means for oscillating said member to and fro about said spindle, means for driving said column from said member during the forward movement of the latter, means for arresting movement of the column while the member returns, parison molds mounted on said column above the finishing molds, cam-actuated mechanism for opening and closing and for raising and lowering the parison molds, cams on said member for actuating said mechanism during the return motion of the oscillatory member, and a cam track on said member, for raising one finishing mold into transfer position and for closing it upon the parison while the column is stationary and while allowing the preceding mold to fall, and for opening a finishing mold at the delivery position.

In testimony whereof I have affixed my signature.

ALEXANDER FRANCIS McNISH.